United States Patent [19]

Chen

[11] Patent Number: 5,364,498
[45] Date of Patent: Nov. 15, 1994

[54] ETCH METHOD FOR MANUFACTURING A COLOR FILTER

[75] Inventor: Kun-Ti Chen, Ren-Der Village, Taiwan, Prov. of China

[73] Assignee: United Microelectronics Corporation, Hsin-Chu, Taiwan, Prov. of China

[21] Appl. No.: 95,262

[22] Filed: Jul. 21, 1993

[51] Int. Cl.$^5$ ................. B44C 1/22; C03C 15/00
[52] U.S. Cl. .................... 156/650; 156/652; 156/655; 156/657; 156/659.1; 156/663
[58] Field of Search ............... 156/629, 630, 633, 644, 156/650, 652, 653, 657, 659.1, 661.1, 667, 655, 663; 427/264, 270, 271

[56] References Cited

U.S. PATENT DOCUMENTS

| | | | |
|---|---|---|---|
| 2,731,333 | 1/1956 | Ko et al. | 156/652 X |
| 3,503,815 | 3/1970 | Johnson | 156/652 X |
| 3,542,453 | 11/1970 | Kantor | 156/655 X |
| 3,914,464 | 10/1975 | Thomasson et al. | 427/270 X |
| 4,894,116 | 1/1990 | Barrow et al. | 156/643 |
| 5,190,794 | 3/1993 | Yoshino et al. | 427/264 X |

*Primary Examiner*—William Powell
*Attorney, Agent, or Firm*—Meltzer, Lippe Goldstein et al.

[57] ABSTRACT

A color filter is made by depositing a plurality of interference films on a substrate of black matrix material. The films are then selectively etched so that different numbers of films are removed at different locations. The color of the filter at a particular location depends on the number of films remaining at the location after etching.

5 Claims, 2 Drawing Sheets

ETCH METHOD FOR MANUFACTURING A COLOR FILTER

FIELD OF THE INVENTION

The present invention relates to a method for manufacturing a color filter for use with a Liquid Crystal Display (LCD).

BACKGROUND OF THE INVENTION

FIG. 1 illustrates the conventional method for making a color filter.

Step A of FIG. 1 shows the starting point, a glass substrate 10 on which is formed a layer 12 a black matrix (Cr) material 12. A layer of photoresist 14 is formed on top of the black matrix material 12. In step B, the photoresist 14 is patterned and removed in selected areas (not shown). The black matrix 12 is then etched in the areas which are exposed due to removal of the photoresist. The remainder of the photoresist is then removed. The result is that portions 16 of black matrix material 12 remain on top of the glass substrate 10.

In step C, the portions 16 of matrix material 12 are coated with gelatin material 18 and a layer 20 of photoresist is deposited on top of the gelatin material 18.

The photoresist 20 is then patterned and it is removed above a particular portion 22 of the gelatin 18. The gelatin portion 22 is then dyed with a red pigment. The remainder of the photoresist 20 is then removed. The result is shown in step D.

The steps C and D are repeated to introduce green dye and blue dye into portions 24 and 26 of gelatin material. The results are shown in steps E.

The result of this method is a color filter with different colors at selected locations.

This conventional method has a number of significant shortcomings. First, the conventional method cannot be used at temperatures above about 300° C. The black matrix layer 12 must itself be patterned, thus requiring an additional substrate layer 10 to be used. In addition, the light radiation resistance of the resulting filter is not good.

It is an object of the present invention to provide a method for making a color filter which overcomes the shortcomings of the prior art process. In particular, it is an object of the invention to provide a process for making a color filter which can be carried out at high temperatures, which does not require the additional substrate layer required for such patterning, which has good light radiation resistance, and which has good adhesion.

SUMMARY OF THE INVENTION

In accordance with the present invention, a color filter may be manufactured and used as follows. The starting point is a glass substrate. A plurality of filter layers (i.e., interference films) labeled A, B, C are deposited one on top of the other in sequence on the glass substrate. The films A, B, C work according to the interference method, i.e., film A alone appears blue when illuminated with white light, films A and B in combination appear green when illuminated with white light, films A, B, C in combination appear red when illuminated with white light.

An additional film D is deposited on top of the film C. The film D is non-transparent alone or else the combination A, B C, D appears black when illuminated with white light.

The resulting composite, comprising the glass substrate and the interference films A, B, C, D formed thereon in sequence, is selectively etched. No films are removed from locations where it is desired that the filter appear black. The film D is removed alone at locations where a red color is desired (i.e., the films A, B, and C remain). The films D and C are removed from locations where a green color is desired (i.e., the films A and B remain). The films D, C and B are removed from locations where a blue color is desired (i.e., the films A alone remains).

This method for making a filter has a number of significant advantages. First, the method can be carried out at high temperatures. The resulting color filter has good light radiation resistance and good adhesion properties.

DETAILED DESCRIPTION OF THE INVENTION

Figure 1A:
FIG. 1 (A-G) schematically illustrates a prior art method for making a color filter.
Figure 1B:
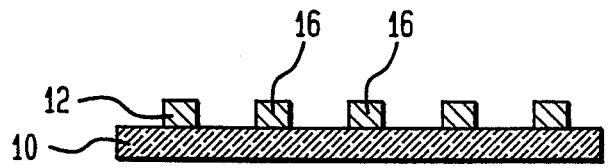
Figure 1C:
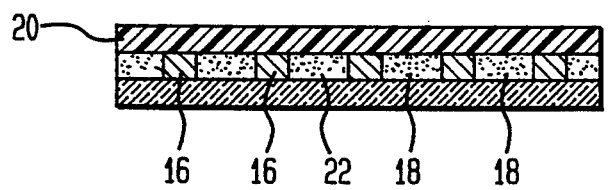
Figure 1D:
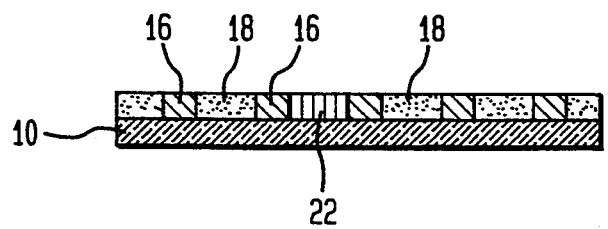
Figure 1E:
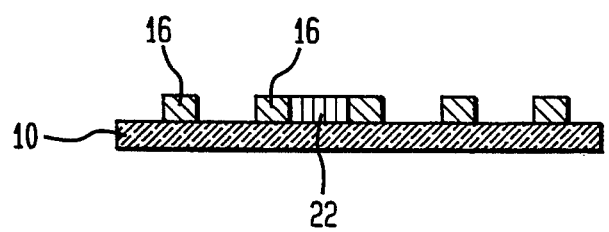
Figure 1F:
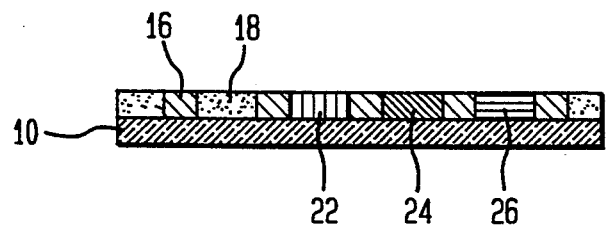
Figure 1G:
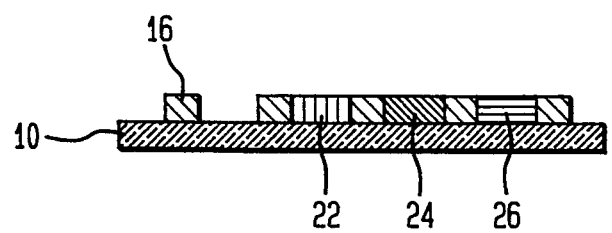
Figure 2A:
FIG. 2 (A-G) illustrates a method for making a color filter in accordance with the present invention.
Figure 2B:
Figure 2C:
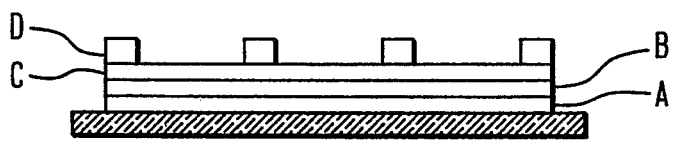
Figure 2D:
Figure 2E:
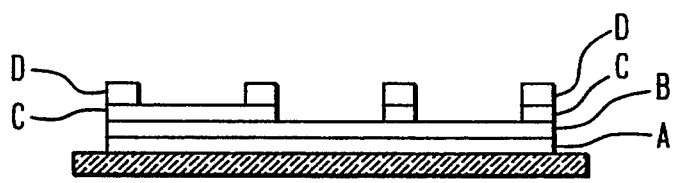
Figure 2F:
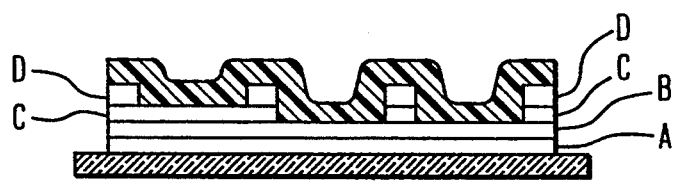
Figure 2G:
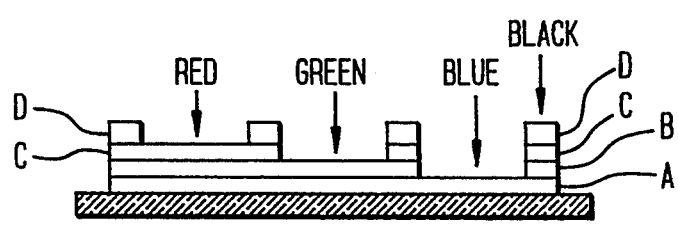

A method for making a color filter in accordance with the invention is illustrated in FIG. 2. In step A, four interference films A, B, C, D are deposited one after the other on a glass substrate. The films are made of dielectric materials, for example, and are deposited using a technique known as sputtering or chemical vapor deposition (CVD). The films A, B, C, and D have a thickness of about 5000-30,000 Angstroms. The thickness of the films varies so that different combinations of the films appear to be different colors as is described in detail below. For example, the film A has a thickness such that it appears blue when illuminated with white light. The film B has a thickness so that the films A and B together appear green when illuminated with white light. The film C has a thickness so that the films A, B, C together appear red when illuminated with white light. The film D is chosen so that it has a thickness such that the films A, B, C, and D together appear black when illuminated by white light. (Alternatively, the film D may be non-transparent.)

In step B, a layer of photoresist (I) is deposited on top of the interference film D. This photoresist layer is patterned to form openings therein (not shown). The layer D is then etched in the openings of the photoresist layer. The etchant is a dry or wet etchant. The depth of the etching is controlled so that only the layer D is removed by controlling the duration of the etching. After the etching, the remaining photoresist material is removed and the result is shown in step C of FIG. 2.

As shown in step D, another layer of photoresist (II) is deposited on the structure. The layer of photoresist (II) is patterned to form openings therein (not shown). The films D and C are then etched through the openings in the photoresist (II) layer. The duration of the etching step is controlled to insure that only the films D and C are etched and the films A and B remain. The photoresist (II) is then removed and the resulting structure is as shown in step E.

As shown in step F, another layer of photoresist (III) is then deposited on the structure. This photoresist (III) layer is then patterned to form openings therein (not shown). The films D, C, and B are then etched through the openings in the photoresist (III) layer. Again the duration of the etching is controlled so that the films D, C, and B are removed but the film A remains. After this last etching step, the photoresist III is removed.

The resulting color filter structure is as shown in step G. The locations where films A, B, C, and D remain appear black. The locations where films A, B, and C remain appear red. The locations where films A and B remain appear green. The locations where only film A remains appear blue.

As indicated above, this color filter structure has a number of significant advantages. First, the process can be carried out at high temperature. In addition, the resulting filter structure has good light radiation resistance and good adhesion.

Finally, the above described embodiments of the invention are intended to be illustrative only. Numerous alternative embodiments may be devised by those skilled in the art without departing from the spirit and scope of the following claims.

What is claimed is:

1. A method for making a color filter comprising
   depositing a predetermined sequence of dielectric interference films on a substrate so that the films are one on top of the other, and
   selectively etching the films to remove different numbers of films from different locations to obtain different colors at said different locations, the color at each location depending on the number of films said etching step removes at the location.

2. The method of claim 1 wherein each of said different locations covered by each interference film of said sequence of interference films has a black color.

3. The method of claim 1 wherein said filter is black at a location at which no film is removed.

4. A method for making a color filter comprising the steps of
   providing a substrate on which are deposited one on top of the other a predetermined sequence of dielectric interference films, and
   in a plurality of sequential etching steps, selectively etching said films, with different numbers of films being etched in each etching step, so that different numbers of films remain at different locations, the number of films remaining at a location determining the color of the filter at that location.

5. The method of claim 4, wherein said substrate is glass material.

* * * * *